Nov. 1, 1955
B. F. HEAL
2,722,058
MOW HAY DRIER WITH LATERAL AND VERTICAL DUCT CONSTRUCTION
Filed Sept. 10, 1951
2 Sheets-Sheet 1
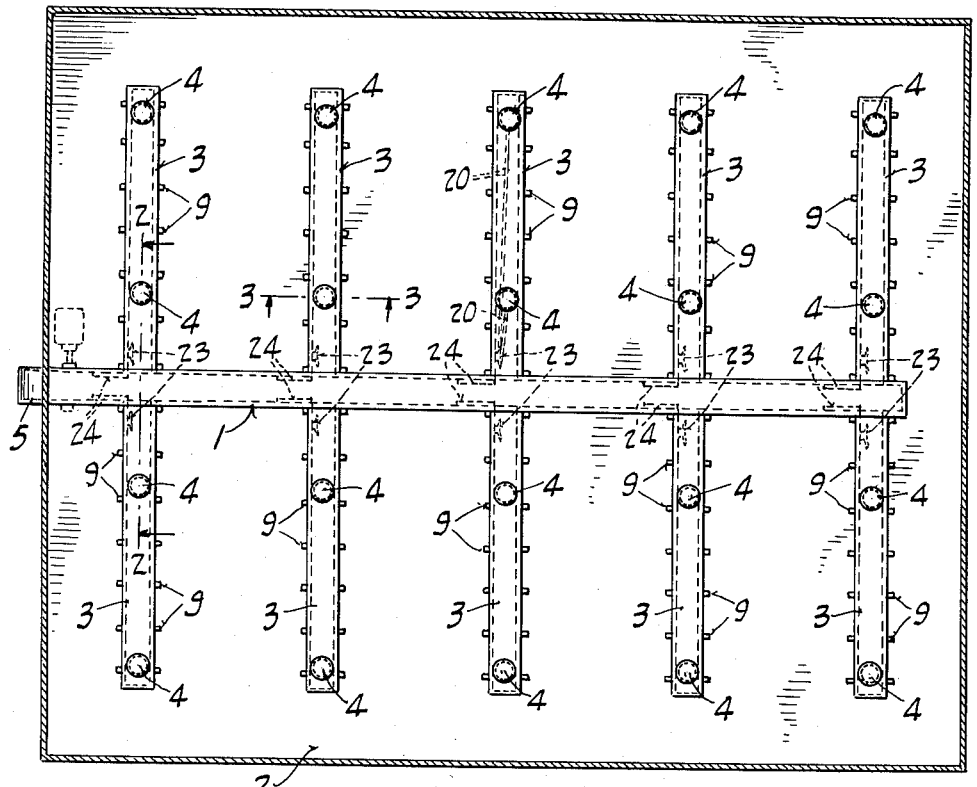
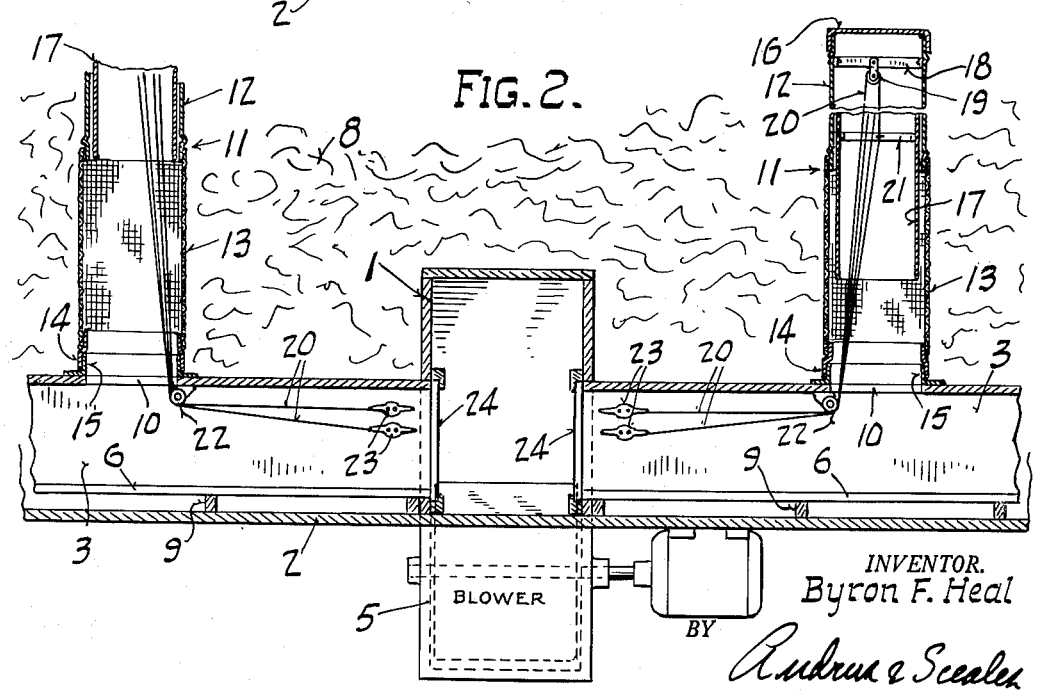
INVENTOR.
Byron F. Heal
BY
Andrus & Scealer
ATTORNEYS.

Nov. 1, 1955  B. F. HEAL  2,722,058
MOW HAY DRIER WITH LATERAL AND VERTICAL DUCT CONSTRUCTION
Filed Sept. 10, 1951  2 Sheets-Sheet 2
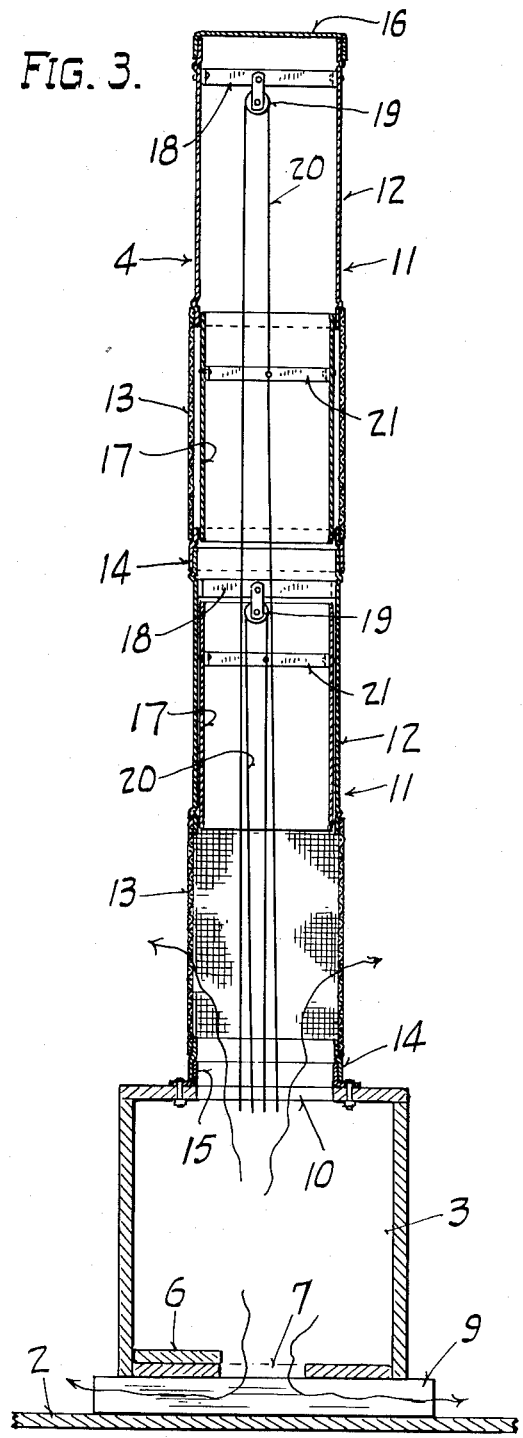
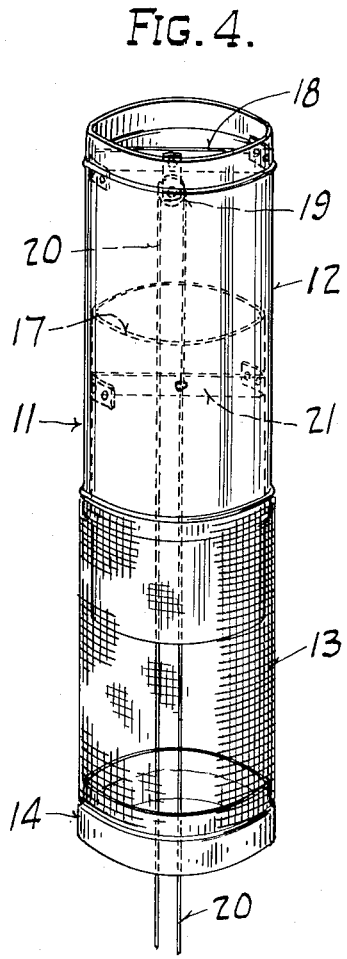
INVENTOR.
Byron F. Heal
BY
*Andrus & Scealex*
ATTORNEYS.

2,722,058

MOW HAY DRIER WITH LATERAL AND VERTICAL DUCT CONSTRUCTION

Byron F. Heal, Waukesha, Wis.

Application September 10, 1951, Serial No. 245,838

5 Claims. (Cl. 34—232)

This invention relates to mow hay driers and is based upon an improved lateral and vertical duct construction.

The invention constitutes an improvement upon the invention described and claimed in applicant's copending application Serial No. 172,693, filed July 8, 1950 for Mow Hay Drier, now Patent No. 2,656,783, and the present application constitutes a continuation in part of said application.

One of the principal objects of the invention is to simplify the construction of the drier.

Another object is to improve the operation of the drier.

Another object is to facilitate manual adjustment of the several openings for discharge of air into the hay.

Another object is to provide a mow hay drier in which the several vertical ducts can be placed prior to loading of hay into the mow and the several openings in the ducts can be adjusted without manual tramping upon the hay and without climbing.

Another object is to provide a stack section which can be standardized in construction to be assembled with other like sections to provide vertical ducts or stacks of any suitable height, and in which each section embodies within itself a closed portion and an air discharge portion with valve means for adjusting the latter.

Other objects and advantages will be set forth hereinafter in the description of an embodiment of the invention illustrated in the accompanying drawings.

According to the invention as related to the lateral ducts, the latter are constructed with the bottom thereof raised from the floor of the mow as by wood blocks or transverse supports and air is permitted to discharge downwardly from the bottom as by removing or hinging one of the boards constituting the bottom of the lateral duct.

According to the invention as related to the vertical stacks, the latter are constructed of standard cylindrical sheet metal sections joined together like stove pipe and each section is made up with one part of open expanded metal and with a closure member within the section adapted to move inside to close or open the expanded metal or grill part to either prevent or permit the discharge of air therethrough.

The invention provides suitable controls for the valve members of the several sections so that the several air outlets into the hay may be adjusted without tramping upon the hay.

In the drawings:

Figure 1 is a top plan view of a mow hay drier constructed in accordance with the invention;

Fig. 2 is a vertical section of a lateral duct taken generally on line 2—2 of Fig. 1;

Fig. 3 is a vertical section of a lateral duct taken on line 3—3 of Fig. 1 showing air being discharged into the hay at the bottom of the duct and also through the vertical flue; and Fig. 4 is a perspective view of a flue section.

The mow hay drier comprises, in general, a main duct 1, usually extending longitudinally along the center or one side of the mow floor 2, a plurality of lateral ducts 3 connecting with the main duct 1, and one or more vertical stacks or flues 4 extending upwardly from each lateral duct 3 and if desired, from the main duct 1.

Main duct 1 is usually constructed of wood and extends along the floor 2 for substantially the full length of the mow. A large capacity fan or blower 5 which is supported on floor 2 discharges into duct 1 and serves to supply drying air to the system.

Air is distributed by duct 1 to lateral ducts 3 extending at right angles to duct 1 and across the mow along floor 2. Lateral ducts 3 are spaced about five feet apart and each is constructed of wood with a generally rectangular cross-sectional configuration.

One of the boards 6 constituting the bottom of each of the ducts 3 may be removed to provide an opening 7 through which air is discharged into the hay 8 at floor level. Board 6 may be manually inserted or removed from the opening 7 or it may be hinged and swung open to any desired position. By varying the effective size of openings 7 through use of boards 6 the amount of air discharged through openings 7 may be controlled.

Ducts 3 are supported above floor 2 by a plurality of transverse spacer blocks, 9. Blocks 9 provide a shallow clearance between ducts 3 and floor 2 for the discharge of air through openings 7 into the hay 8 at floor level.

To increase the effective depth of drying without continually and excessively drying the lower portion of the hay 8, the top surface of each duct 3 is provided with a plurality of spaced openings 10, each of which receives a vertical flue 4.

Each flue 4 extends upwardly through the hay and consists of a plurality of generally cylindrical sheet metal sections 11 which are assembled in a manner similar to stove pipe to provide a flue of any suitable height.

Each section 11 is about 4 feet in vertical length and comprises an upper closed portion or half 12 and a lower air discharge half or vent 13. The air discharge portion may be formed of a screen grill, perforated or expanded metal sheet, or any other material which will permit air to pass therethrough into the hay.

The lower end of each flue section 11 is crimped outwardly to define a bell-shaped end 14 which is telescoped by the upper end of the adjacent section 11 to provide a relatively air-tight joint between each section and maintain proper alignment of the sections.

The openings 10 in ducts 3 are surrounded by upwardly extending flange rings 15 which are received within the lower ends 14 of the first flue sections 11 and serve to register flues 4 with openings 10.

The upper end of the top section 11 of each flue 4 is closed off by a suitable cap 16.

A generally cylindrical valve member 17 is employed within each flue section 11 to control the discharge of air through the vents 13. Valve member 17 is formed with a lesser diameter than section 11 and is adapted to slide therein to close or open the vents 13 and thereby regulate the discharge of air through said portion.

To move valve member 17 within section 11 an S-shaped bracket 18 is secured to the inner surface of each section 11 adjacent the upper end thereof. Bracket 18 supports a pulley 19 which carries an endless rope 20.

Rope 20 is attached to a bracket 21, similar to bracket 18, which is secured within the upper portion of valve member 17. As rope 20 is manipulated the valve member 17 will be raised or lowered within section 11 to control the discharge of air through vent 13.

The rope 20 of each section 11 hangs downwardly through the entire stack of sections therebeneath to lateral duct 3. Each rope 20 passes over a pulley 22 and then extends inwardly to the mouth of duct 3 where it is tied to a suitable cleat 23. The portion of the ropes 20 secured at the mouth of duct 3 are marked in a suitable manner to designate flue, section and open or closed position so that the operator, passing within main duct 1, may conveniently select and operate the proper valve member 17 to obtain the desired air discharge into the hay.

Air discharge may be cut off to any portion of the mow by sliding doors 24 which are disposed at the mouth of each lateral duct 3. Similar doors may be placed at the bottom of stacks 4 if desired. By selectively opening or closing doors 24 air can thus be distributed to any or all portions of the mow.

The operation of the present invention is begun when the hay level in the mow reaches a level of several feet above floor 2. At this time doors 24 are open and valve members 17 are each in the lowermost position within the respective flue sections 11 to prevent discharge of air through vents 13 into the hay. The openings 7 in lateral ducts 3 are open so that the drying air will be discharged into the hay at floor level.

As the hay mow is filled around flues 4 to a level of three or four feet above ducts 3, valve members 17 within the lowermost section are manually raised by pulley ropes 20 to discharge air through vents 13. At the same time air discharge is continued through openings 7 into the hay at floor level until the latter is properly dried, at which time openings 7 are closed off by boards 6 and all the air is directed into the hay through flues 4.

As the mow is filled and the hay level is raised about three or four feet above the vents 13 of the first or lowermost sections 11, the proper valve members 17 are raised by ropes 20 to discharge air through the vents 13 of the second tier of sections 11. As the hay level continues to rise, the vents 13 of the remaining sections are successively opened by raising the corresponding valve members 17 to permit air discharge at a level of about three to about four feet below the hay level. As the hay is suitably dried at successive levels the air discharge to this dried level is correspondingly cut off by lowering valve members 17.

By the method of the present invention the air is discharged into the hay only at the level where it may be most effectively utilized to dry the fresh green hay. Air is not discharged into the dried portion of the hay, thereby eliminating the tendency to overdry the lower portion of the hay in the mow and thus preventing loss of food value.

The rate of drying is ordinarily related to the rate of filling the mow to provide drying of each foot of hay at about the same rate as that for filling each foot of depth of the mow. It is preferred to maintain the air discharge into the hay at a point at least three feet below the hay level to obtain the most efficient drying and air distribution.

Various embodiments may be included within the scope of the accompanying claims.

I claim:

1. In a mow hay drier an air distributing system comprising a main air duct, a plurality of lateral branch ducts extending outwardly from said main duct and being spaced above the floor of the mow, said lateral ducts having openings in the bottom thereof to discharge air into the hay at floor level and having a plurality of upward openings therein for the upward discharge of air into the hay, valve means within each lateral duct for closing the openings in the bottom of the lateral ducts after the hay at floor level is suitably dried, a flue extending upwardly from each of said upward openings and defining a passageway for the distribution of air into the upper levels of hay in the mow, said flue having a closed portion and a perforate air discharge portion, and valve means slidable within each flue for opening and closing said perforate portion to control the passage of air therethrough into the hay.

2. In a mow hay drier, an air distributing duct having a plurality of upward openings therein for the discharge of air upwardly through the hay, a plurality of flue sections extending upwardly from corresponding said openings and each defining a passageway for the distribution of air into the hay, each of said flue sections having a closed portion and a plurality of vertically spaced perforate air discharge portions to discharge the air laterally into the hay, and separate valve means within each flue section for opening each of the perforate portions of said section when the hay in the mow has reached a predetermined depth surrounding the perforate portion to be opened and for closing said perforate portion of said section after the hay in the area surrounding the same is suitably dried.

3. In an air distributing system for a mow hay drier an air duct spaced above the floor of the mow and having openings in the bottom thereof to discharge air into the hay at floor level, means for closing said openings to cut off the discharge of air to the floor level after the mow is filled to a predetermined depth, at least one flue communicating with said duct and extending upwardly therefrom for the upward discharge of air into the hay, each said flue having a closed portion and an air discharge portion, valve means slidable within each flue for opening and closing said air discharge portion, valve control means within each flue and extending downwardly into said air duct for selectively controlling the movement of said valve means within said flue and means in said air duct and removed from the valve means to operate the valve control means to open the air discharge portion and then to close the same after the hay surrounding the air discharge portion is suitably dried.

4. In a mow hay drier an air distributing system comprising a main air duct, a plurality of lateral branch ducts extending outwardly from said main duct, said lateral ducts having a plurality of upward openings therein for the discharge of air upwardly through the hay, a plurality of flue sections adapted to fit together at their adjacent ends extending upwardly from each of said openings and defining a passageway for the distribution of air into the hay, each of said flue sections having a closed portion and an air discharge portion to discharge the air laterally into the hay, valve means slidable within each flue section to open and close the air discharge portion of each section, and control means within each flue section for selectively controlling the movement of each valve means to permit the discharge of air through the air discharge portion of the lowermost section into the hay when the mow has reached a predetermined depth and to successively permit the discharge of air through the discharge portions of the remaining sections as the depth of the mow continues to increase, said control means of each flue section extending downwardly through the flue sections therebeneath to the corresponding lateral duct and hence laterally therein to a point of control at the junction of said lateral duct with the main duct for operation of the valve removed from the air discharge portion to close the air discharge portion when hay surrounding the same is suitably dried.

5. In a mow hay drier, a substantially horizontal air distributing duct having a plurality of upward openings therein for the discharge of air upwardly through the hay, a plurality of flue sections extending upwardly from corresponding said openings and each defining a passageway for the distribution of air into the hay, each of said flue sections having at least one perforate air discharge portion to discharge air laterally into the hay, valve means operable within said flue section to close said air discharge portion, means normally closing said flue above said air discharge portion when the latter is open, and means to open said flue for the discharge of air at a level above said air discharge portion when the latter is closed, whereby air is discharged from said flue at selected successive heights in said mow.

References Cited in the file of this patent

UNITED STATES PATENTS

| | | |
|---|---|---|
| 842,538 | Elward | Jan. 29, 1907 |
| 1,119,941 | Elliott | Dec. 8, 1914 |
| 1,256,677 | French | Feb. 19, 1918 |
| 1,900,846 | Russell et al. | Mar. 7 1933 |
| 1,929,084 | Strub | Oct. 3, 1933 |
| 2,196,391 | Gronert | Apr. 9, 1940 |
| 2,251,617 | Pirnie | Aug. 5, 1941 |

FOREIGN PATENTS

| | | |
|---|---|---|
| 76,963 | Sweden | Feb. 5, 1931 |
| 43,903 | France | July 2, 1934 |

(1st Addition to No. 691,475)